E. C. BOWDEN-SMITH.
VALVE.
APPLICATION FILED JULY 1, 1920.

1,392,294.

Patented Oct. 4, 1921.

INVENTOR:
Edward C. Bowden-Smith
By Wm Wallace White
ATT'Y.

E. C. BOWDEN-SMITH.
VALVE.
APPLICATION FILED JULY 1, 1920.

1,392,294.

Patented Oct. 4, 1921.
2 SHEETS—SHEET 2.

INVENTOR:
Edward C. Bowden-Smith
BY Wm Wallace White
ATT'Y.

UNITED STATES PATENT OFFICE.

EDWARD CYRIL BOWDEN-SMITH, OF LONDON, ENGLAND.

VALVE.

1,392,294.  Specification of Letters Patent.  Patented Oct. 4, 1921.

Application filed July 1, 1920. Serial No. 393,412.

(GRANTED UNDER THE PROVISIONS OF THE ACT OF MARCH 3, 1921, 41 STAT. L., 1313.)

*To all whom it may concern:*

Be it known that I, EDWARD CYRIL BOWDEN-SMITH, of 21 Kensington Park Gardens, London, W. 11, England, a subject of the King of Great Britain and Ireland, have invented certain new and useful Improvements in or Relating to Valves, (for which I have filed application in Great Britain, Jan. 9, 1914, Patent No. 648 of 1914,) and of which the following is a specification.

This invention relates to clack valves of the type which pivot on a fulcrum formed on an extension of the valve casing so that they can be readily removed.

A valve made in accordance with this invention is provided with an arm which forms a guide and coacts with guide plates formed on the valve seat. This guide is clear of the passage of the liquid through the valve and is vertically disposed so as to insure a well defined vertical movement of the valve. On the valve and arm are stops or lugs which coact with the guide plates or stops on the said plate. These stops limit the movement of the valve. The pivotal point of the valve is disposed on the arm and is located between the stops, the stops being so arranged that the valve cannot be accidentally dislodged but is capable of being removed by a joggling movement without the use of tools.

Referring to the drawings filed herewith:—

Fig. 3 is a plan of a multiple valve, of which

Figure 1:
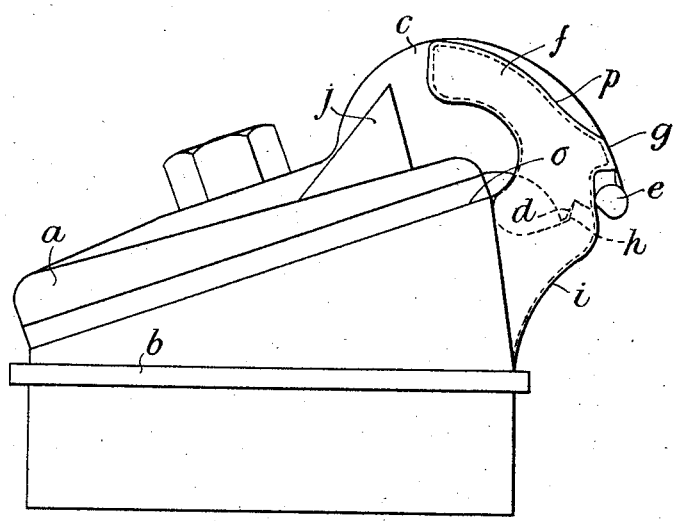
Figure 1 is an elevation of one form of valve made in accordance with this invention.
Figure 2:
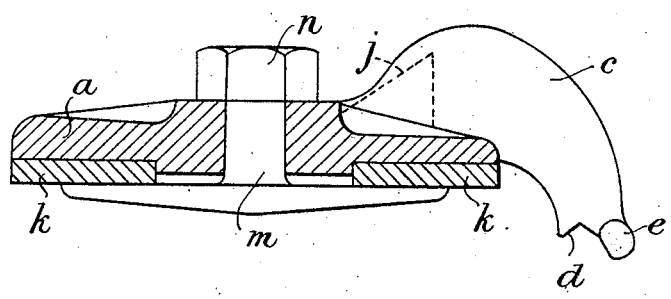
Fig. 2 is a section of the valve.
Figure 3:
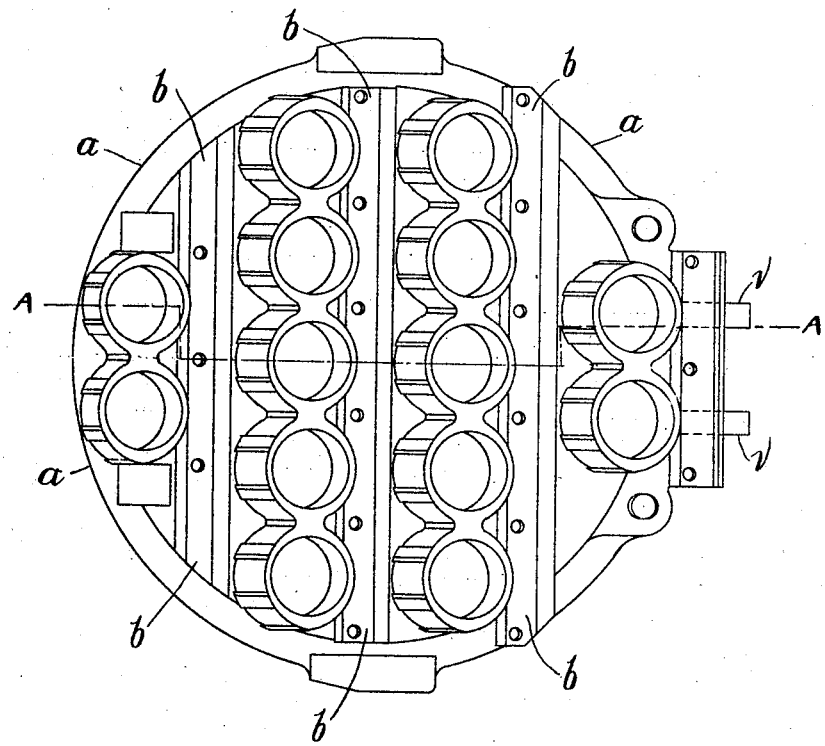
Figure 4:
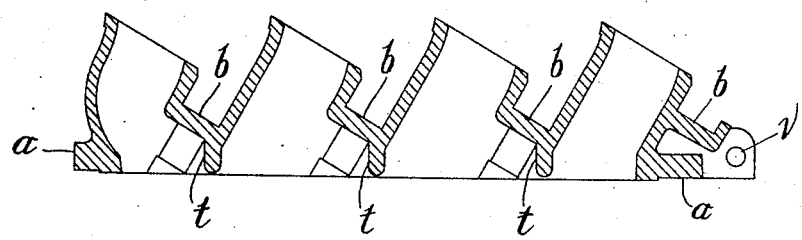
Fig. 4 is a section along A—A.

$a$ is the valve, $b$ is the casing or seat, $c$ is an arm or extension of the valve which is provided with a V-shaped groove $d$ and with lugs or stops $e$. The arm $c$ is adapted to form a guide which coacts with guide plates $f$ formed on the valve seat. On the guide plates $f$ are stops $g$. $j$ $j$ are stops formed on the valve. The stops $j$ and $e$ limit the movement of the valve so that it cannot be accidentally dislodged. The valve is pivoted between the stops $j$ and $e$ on a V-shaped edge $h$ formed on an extension $i$ of the valve seat, said edge engaging with the groove $d$. $k$ is a packing secured in position by a flanged stud $m$ and nut $n$ disposed on top of the valve.

In use the valve pivots on the edge $h$. In the event of any solid matter becoming caught between the valve and the seat at $o$ for instance, the lugs $e$ engage with the stops $g$ and prevent the valve from being displaced. To remove the valve, a joggling motion is required. The arm $c$ is raised so that the groove $d$ is lifted off the edge $h$, the arm is then pushed back till the lugs $e$ are clear of the stops $g$ $g$ when it is found by reason of the curved recess $p$ in the back of the guide plates $f$, the arm $c$ is disengaged from the guides, the lugs $e$ passing over the guide plates $f$ in a forward direction.

The valve can be rectangular or other form with one or more arms or guides and may be set in a horizontal, vertical or sloping position.

With a valve made in accordance with this invention there is no working hinge, spindle or pin, and it can be removed or replaced by hand without the use of any tool.

The valve is entirely independent of the seat when in position, simply resting on the seat without the aid of nuts or pins, the valve and seat being locked by lugs and stops to prevent displacement.

The valve may of course be used without packing when the metal valve and the seat are the only two parts.

With a valve made in accordance with this invention I obtain a clear valve way which can be used particularly in chambers of multiple valve pumps, the valve is held absolutely evenly on its seat and is not affected by any wear in the ridge or recess.

In this valve the advantages of the mushroom and disk valves are combined with the advantages of the flap or free way valve. A wide aperture is obtained for passing solids as in a hinged valve though no hinge is employed with the even seating of a disk or mushroom valve without a spindle guide or grid which obstructs the flow through the valve. A plurality of such valves may be used on one same valve plate.

What I claim and desire to secure by Letters Patent is:—

1. A clack valve comprising a casing, an extension on said casing, a valve pivotally connected to said casing, said pivotal connection comprising a V shaped edge on said extension and an arm formed on said valve, and a V shaped groove and lugs on said arm, said V shaped groove coacting with the said V shaped edge on the extension of the valve casing.

2. A clack valve comprising a casing, an extension on said casing, a valve pivotally connected to said casing, said pivotal connection comprising a V shaped edge on said extension and an arm formed on said valve, a V shaped groove and lugs on said arm, said V shaped groove coacting with the said V shaped edge on the extension of the valve casing; guide plates on said valve casing adapted to coact with said arm formed on the valve whereby a rigid vertical motion of the valve is insured, said guide plates being clear of the passage of the liquid through the valve.

3. A clack valve comprising a casing, an extension on said casing, a valve pivotally connected to said casing, said pivotal connection comprising a V shaped edge on said extension and an arm formed on said valve, a V shaped groove and lugs on said arm, said V shaped groove coacting with the said V shaped edge on the extension of the valve casing; guide plates on said valve casing adapted to coact with said arm formed on the valve whereby a rigid vertical motion of the valve is insured, said guide plates being clear of the passage of the liquid through the valve, and means comprising stops whereby the valve cannot be accidentally displaced but is capable of being removed by a joggling movement of the valve without the use of tools.

4. A multiple valve comprising a valve plate, a plurality of valve casings thereon, a valve way and an extension for each casing, a valve pivotally connected to each said casing, said pivotal connections comprising a V shaped edge on each said extension and an arm formed on each said valve, and a V shaped groove and lugs on each said arm, each said V shaped groove co-acting with the said V shaped edge on the extension of each corresponding valve casing.

In testimony whereof I have signed my name to this specification.

EDWARD CYRIL BOWDEN-SMITH.